(12) United States Patent
Fehr et al.

(10) Patent No.: US 7,999,408 B2
(45) Date of Patent: Aug. 16, 2011

(54) POWER AND COMMUNICATION ARCHITECTURE FOR A VEHICLE

(75) Inventors: Walton L. Fehr, Mundelein, IL (US); Patrick Jordan, Austin, TX (US); Donald Remboski, Dearborn, MI (US); Samuel M. Levenson, Arlington Heights, IL (US); John Qualich, Buffalo Grove, IL (US)

(73) Assignee: Continental Automotive Systems, Inc., Deer Park, IL (US)

( * ) Notice: Subject to any disclaimer, the term of this patent is extended or adjusted under 35 U.S.C. 154(b) by 2122 days.

(21) Appl. No.: 10/439,702

(22) Filed: May 16, 2003

(65) Prior Publication Data

US 2004/0227402 A1    Nov. 18, 2004

(51) Int. Cl.
*B60L 1/00* (2006.01)
(52) U.S. Cl. ...................................................... 307/10.1
(58) Field of Classification Search ................... 307/9.1, 307/10.1; 907/10.1
See application file for complete search history.

(56) References Cited

U.S. PATENT DOCUMENTS

| | | | |
|---|---|---|---|
| 5,418,401 A * | 5/1995 | Kaneyuki | 307/10.1 |
| 5,623,169 A * | 4/1997 | Sugimoto et al. | 307/10.1 |
| 6,157,091 A * | 12/2000 | Yoshida et al. | 307/10.1 |
| 6,198,244 B1 | 3/2001 | Hayden et al. | |
| 6,420,797 B1 * | 7/2002 | Steele et al. | 307/9.1 |
| 6,507,506 B1 * | 1/2003 | Pinas et al. | 363/79 |
| 6,528,899 B1 * | 3/2003 | Saito et al. | 307/10.1 |
| 6,791,207 B2 * | 9/2004 | Yoshida et al. | 307/10.1 |
| 2002/0113492 A1 * | 8/2002 | Sakamoto et al. | 307/10.1 |
| 2002/0180271 A1 * | 12/2002 | Taniguchi et al. | 307/10.1 |
| 2003/0001434 A1 * | 1/2003 | Saito et al. | 307/10.1 |

FOREIGN PATENT DOCUMENTS

WO    WO-01/16686 A1    3/2001

* cited by examiner

*Primary Examiner* — Michael Rutland Wallis

(57) ABSTRACT

A power, ground and communication architecture (100) utilizes hubs (105, 110, 115). Each hub (105, 110, 115) contains computing, communication and power management elements (135, 140). Hubs (105, 110, 115) may be connected to multiple other hubs (105, 110, 115) to distribute communication and power in a freeform web-type arrangement, specific tree, bus or star arrangements are not required. Standardized wiring harness segments (120) are used to join the hubs (105, 110, 115) and control elements. Each of the strands in the web may be an independent point-to-point bus and isolated power line.

16 Claims, 6 Drawing Sheets

POWER AND COMMUNICATION ARCHITECTURE FOR A VEHICLE

TECHNICAL FIELD

This patent relates to vehicles and more particularly to a power and communication architecture for a vehicle.

BACKGROUND

Vehicle builders have been using serial communication (multiplexing) between controllers to share information and distribute control for some time. Doing so has greatly reduced the amount of cross-vehicle signal wiring in the vehicle's electrical distribution system (EDS) needed to implement the comfort, convenience, and safety features desired in modern vehicles.

However, not much has been done to simplify the power and ground distribution part of the EDS. Batteries and alternators (power sources) are usually used to provide power to the vehicle. To distribute the power, the positive side of the power source is connected to fuse blocks that are located in the engine compartment or the passenger compartment of the vehicle. The fuse blocks serve as distribution points for power feed to devices, e.g., actuators, sensors and control elements. The fuse blocks also house the protection devices, circuit breakers and fuses, for the power feeds. The minus side of the power source is often connected to the metal components of the vehicle (body, chassis, engine block, etc.) which then serve as the ground return path from all of the active elements.

Control of the devices in the vehicle to implement desired features is divided into controllers by function or by location (engine, navigation, passenger seat, driver seat, door, etc.). The controller in each of the zones shares information with other controllers using a shared-access serial bus. The bus usually follows an industry standard such as J1850, CAN, MOST. Multiple, independent busses may be used. In that case, one of the controllers acts as a gateway for information between the incompatible busses. Each make and model of vehicle tends to have a unique collection of controllers and devices. Vehicle manufactures also tend to use proprietary serial busses. As a result, each vehicle's EDS must be uniquely designed. Even though many signal wires have been saved by using serial busses, there is another opportunity to improve the efficiency of the EDS if power and ground distribution is dealt with as well.

An alternative architecture introduces the idea of dividing the vehicle into geographic regions and locating a single controller for all of the features in that region. This architecture may also include the concept of smart peripherals to reduce the number of interconnections in localized areas of the vehicle. The smart peripherals use simple serial communication busses such as LIN to relay information from sensors to the zone controller or to accept actuator commands from the zone controller. The zone controllers also act as power and ground distribution points for the smart peripherals.

Another alternative architecture incorporates a junction block that can be located in various zones of the vehicle. The junction block provides a mechanical and electrical connection point for power, ground and communication for small devices that are used to interface to input and output devices. The junction block also provides over current protection devices for the small connected devices, and multiple power sources distributed at different levels within the system.

Existing power, ground and control distribution architectures, while offering elements of flexibility, still require vehicle specific wiring harnesses and rigid power distribution structure and control. Moreover, these existing structures have not addressed signal wiring complexity in localized areas. Thus there is needed a flexible power, ground and control distribution architecture for the entire vehicle that is also adaptable to localized areas of the vehicle.

BRIEF DESCRIPTION OF THE DRAWINGS

This disclosure will describe several embodiments to illustrate its broad teachings. Reference is also made to the attached drawings.

DETAILED DESCRIPTION

Figure 1:
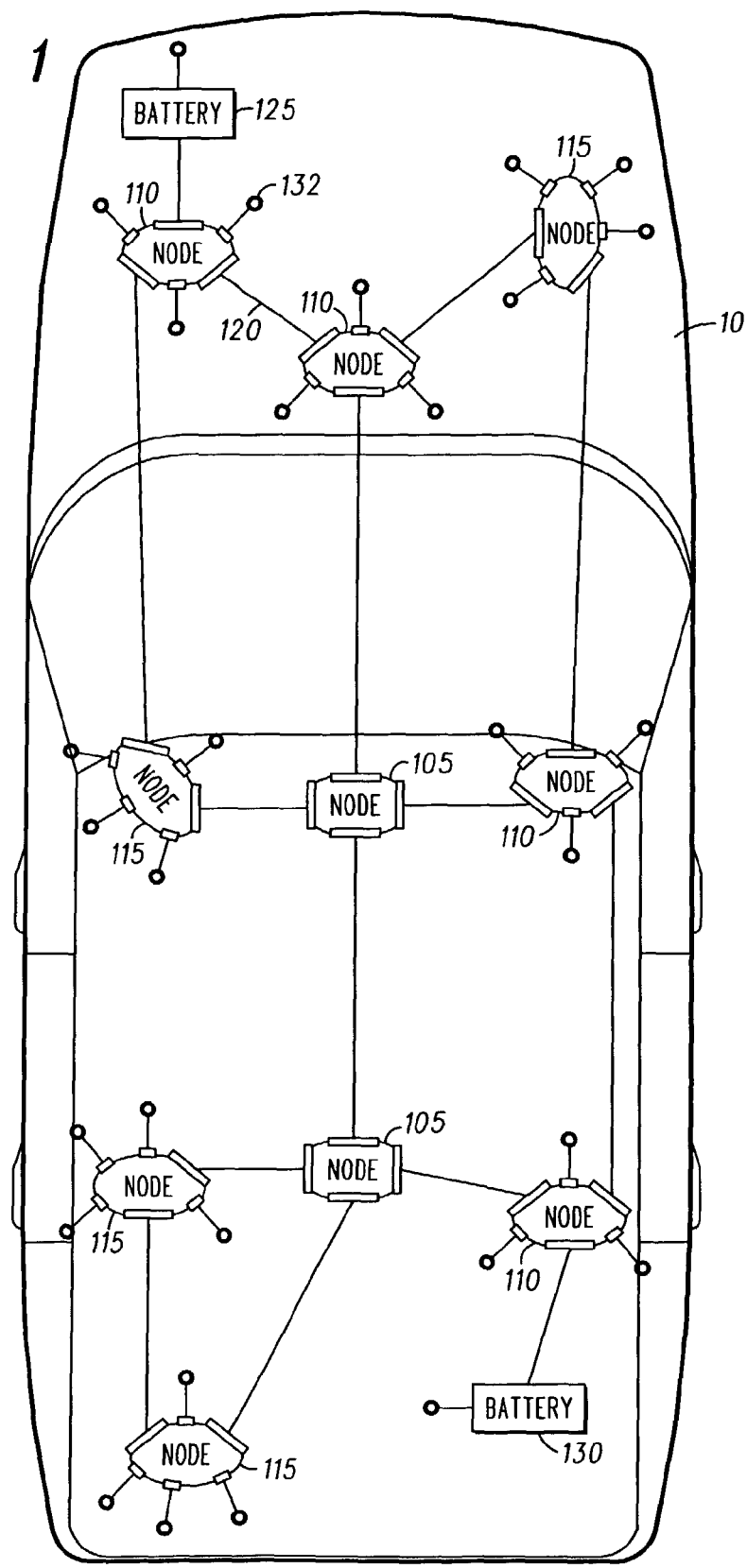
FIG. 1 is a schematic illustration of a communication and power distribution architecture.

A power, ground and communication architecture utilizes hubs in place of zone controllers and fuse blocks. The architecture is particularly adapted for use in vehicles, such as automobiles and trucks, but may be adapted to numerous other applications. Each hub contains computing, communication and power distribution elements. Hubs may be connected to multiple other hubs to distribute communication and power in a freeform, web-type arrangement. Specific tree, bus or star arrangements are not required. Standardized wiring harness segments can be used to join the hubs and control elements.

Each of the strands in the web may be considered an independent point-to-point bus and isolated power line. Each of the hubs may contain computing capability to implement features as well as the signaling devices, e.g., packet routers, circuit switches, and the like, and power protection devices needed for communication and power distribution. The power distribution architecture may be joined with the intelligence and communication capability of the signaling network to provide enhanced fault management and communication. The power distribution and signaling network may be adapted to cooperate to monitor the power distribution medium, to detect and diagnose faults and to communicate this information to other controllers and other areas of the power distribution network. The web-type arrangement of the architecture allows potentially for dynamic rearrangement to effect repairs in the event of a power fault.

Although the following text sets forth a detailed description of numerous different embodiments of the invention, it should be understood that the legal scope of the invention is defined by the words of the claims set forth at the end of this patent. The detailed description is to be construed as exemplary only and does not describe every possible embodiment of the invention because describing every possible embodiment would be impractical, if not impossible. Numerous alternative embodiments could be implemented, using either current technology or technology developed after the filing date of this patent, which would still fall within the scope of the claims defining the invention.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

FIG. 1 illustrates within a vehicle 10 a power, ground and communication architecture 100 that includes a plurality of hubs 105, 110 and 115. The hubs 105, 110 and 115 are joined by standardized wire harness segments in a web-type structure. While a plurality of the wire harness segments are shown in FIG. 1 and used to interconnect the hubs 105, 110 and 115, only one is shown as wire harness segment 120. Throughout this disclosure, reference to wire harness segment 120 in either the singular or plural refers to the one or more wire harness segments used to interconnect the hubs 105, 110 and 115. The architecture also includes a plurality of power sources such as batteries 125 and 130. Additional power sources such as generator/alternators, capacitors, fuel cells or alternative power sources may be employed within the architecture 100. The specific types of power sources are not critical to the structure or function of the architecture 100. The hubs 105, 110 and 115 are configured to couple to one or more other hubs 105, 110 and 115 and to devices, one of which is shown as device 132, within the vehicle 10 via additional wire harness segments 120. The particular types of devices are also not critical to the structure or function of the architecture 100, and typical devices found on a vehicle such as sensors, actuators, controllers, and the like may be coupled to the hubs.

Figure 2:
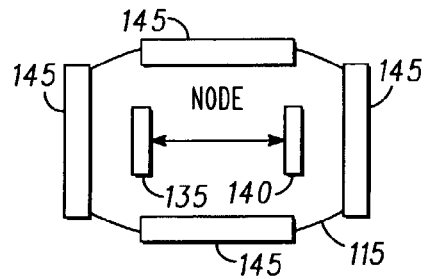
FIG. 2 is a schematic illustration of a node of the communication and power distribution architecture shown in FIG. 1.
Figure 3:
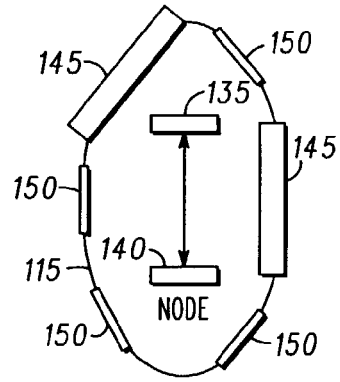
FIG. 3 is a schematic illustration of another node of the communication and power distribution architecture shown in FIG. 1

With continue reference to FIG. 1 and with reference to FIGS. 2 and 3, each of the hubs 105, 110 and 115 may have a processor 135, including a control program stored either in an internal memory or in an associated memory providing central intelligence, and a power manager 140. The hubs 105, 110 and 115 may also be configured with a variety of ports 145 and 150. The ports 145 are configured for interconnecting a hub with another hub. For example, the hub 105 is configured to primarily interconnect to other hubs and is configured with four ports 145. The ports 150 are configured for interconnecting a hub to a device within the vehicle. The hub 110 is configured to interconnect with other hubs and to interconnect devices 132 to the web-type architecture 100. In this regard, the hub 110 may include one or more ports 145 for interconnecting to other hubs and one or more ports 150 for interconnecting to devices 132. Of course, a single port configuration may be used in connection with the hubs 105, 110 and 115 to connect hub-to-hub and hub-to-device. In each configuration, the hubs 105, 110 and 115 will have at least one connector cavity configured to mate with an end of a wire harness segment 120 for hub-to-hub connection.

Figure 4:
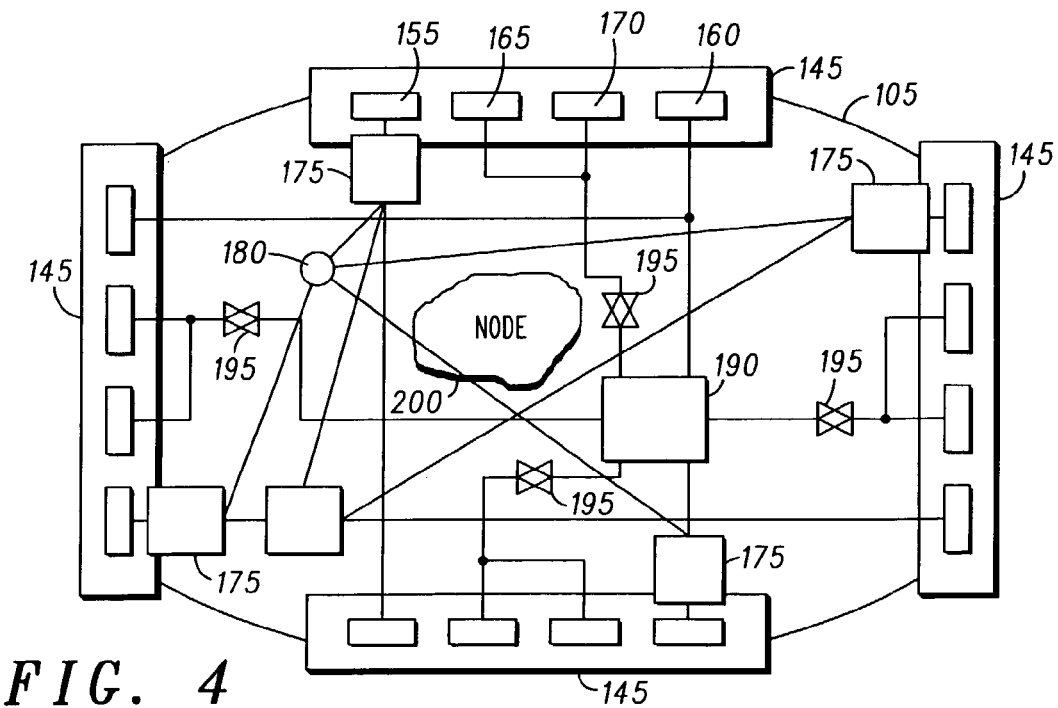
FIG. 4 is a detailed schematic illustration of a node of the communication and power distribution architecture shown in FIG. 1.

Referring now to FIG. 4, the hub 105 is shown in expanded detail. The discussion of the structure and operation of hub 105 is exemplary and applicable to the hubs 110 and 115. Each of the ports 145 include a power conductor pin 155, a ground conductor pin 160 and a first and second signal conductor pin 165 and 170. Although not shown, the ports 150 are similarly configure to accept a power conductor, a ground conductor and signal conductors. Each of the power conductor pins 155 is coupled to a corresponding power manager 175 and from the power manager 175 to a common point or source of power 180. The power manager 175 may have the capability to disconnect the hub 105 from a wire harness segment 120 coupled to the corresponding port 145 upon detection of a power fault. The power manager 175 may also disconnect the hub 105 from a wire harness segment 120 at the direction of a local or central control element, such as control element 185 coupled to each of the power managers 175. The ground pins 160 of the ports 145 are interconnected in a common ground structure to which the operable components of the hub 105 are connected.

The hub 105 may further include a packet router 190. Each of the signal conductor pins 165 and 170 may also be coupled to a passive transceiver 195 for communicating signals between the conductor pins 165 and 170 and the packet router 190, although transceiver functionality may be incorporated into the router 190 or another element of the hub 105. The hub 105 may further include general processing capability 200 for carrying out the general operation of the node, provide control of the packet router 190 and to otherwise implement the functionality of the hub 105 as herein described.

Figure 5:
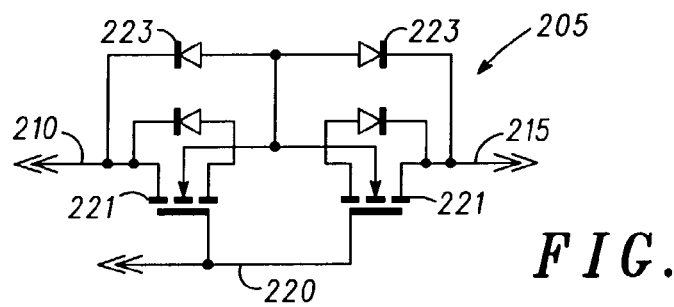
FIG. 5 is a circuit diagram of a power control circuit for use in the communication and power distribution architecture shown in FIG. 1.

FIG. 5 illustrates a circuit 205 that may be used as a passive power manager device, e.g., a passive power manager 175. The circuit is coupled between a node (105, 110, 115) via connector 210, to the corresponding wire harness segment 120 via the connector 215 and to ground via the connector 220. The circuit 205 as shown includes two smart field-effect transistors (FETs) 221 and a pair of diodes 223 for managing voltage input/out from the hub and to protect the hub against power faults.

It is contemplated that the power manager 175 will have added intelligence by way of specific or general purpose processing capability to manager and control inputs and outputs at multiple power levels. Such a configuration for the power manager 175 will allow coupling to the architecture 100 power sources of various current or voltage levels. Use of lower current levels in certain applications may allow for reduced size of the conductors in particular wire harness segments 120. The power manager 175 thus manages the distribution of power from the hubs to the connected devices such that it is provided to the device at the correct power (voltage and current) level. While voltages of between 12 volts and 42 volts are common for providing power to the various devices, sensors and actuators in a vehicle, drive train applications may require higher voltages as high as or in excess of 300 volts. The power manager 175 may be adapted to manage voltages in these ranges.

Figure 6:
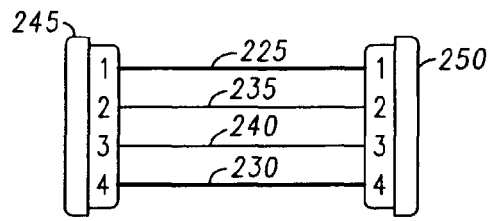
FIG. 6 is a schematic illustration of a wire harness of the communication and power distribution architecture shown in FIG. 1.

Referring again to FIG. 1 and with reference to FIG. 6, each of the wire harness segments 120 may include a power conductor 225, a ground conductor 230 and first and second signal conductors 235 and 240. Each of the power, ground and signal conductors 225-240 have respective ends that terminate into connectors 245 and 250. The connectors 245 and 250 may be configured as male connectors, i.e., pins, or female connectors, i.e., cavities. One of the connectors 245 and 250 may be configured to couple to a corresponding port of a hub 105, 110, 115, while the other of the connectors is configured to couple to either another hub or to a device. To allow consistent application of standardize wire segments within the architecture 100, the connectors 245 and 250 would all be either male or female while the ports 145 and 150 and device ports would all be the corresponding opposite. While the wire harness segment 120 is shown to include two signal conductors, any number of signal conductors may be used. Moreover, the signal conductors do not need to be wires, but can be fiber optic, coax, or any other suitable signal conducting medium. Hence, the two signal conductors 235 and 240 may be a single or multiple fiber optic strands.

Figure 9:
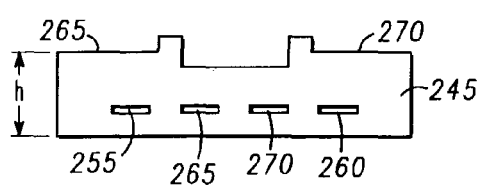
FIG. 9 is a schematic illustration of the connector shown with the wire harness shown in FIG. 6.

As shown in FIG. 6, the power and ground conductors 225 and 230 have a first gage that may be selected to carry a particular current level, or the conductors 225 and 230 may be a pre-selected standard size. With reference to FIG. 9, the corresponding connectors 245 and 250 include cavities 255 and 260 sized to correspond to the power and ground conductors 225 and 230 and suitable electrical connectors (not depicted). Additionally, the body of the connectors 245 and 250 are formed with shoulders 265 and 270 having a height, h. The configuration of the shoulder 265 and 270 provide a mechanism for ensuring a wire harness segment configured for use at a particular current level is not used for an incorrect current level. That is, the various different connector configurations prevent incorrectly connecting hubs, devices and harnesses and to ensure the appropriate harness is used for the given current application.

Figure 10:
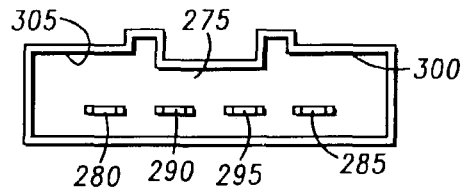
FIG. 10 is a schematic illustration of a cavity foe the connector shown in FIG. 9.

FIG. 10 illustrates a cavity 275 that may be provided on either a hub or a device to which the wire harness segment 120 is to be connected via the connectors 245 and 250. The cavity is formed to include a power pin 280, a ground pin 285 and signal pins 290 and 295. The cavity is further formed with recesses 300 and 305 sized to respectively receive the shoulders 265 and 270.

Figure 7:
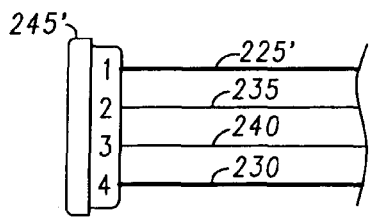
FIG. 7 is a schematic illustration of a portion of an alternate wire harness of the communication and power distribution architecture shown in FIG. 1.
Figure 11:
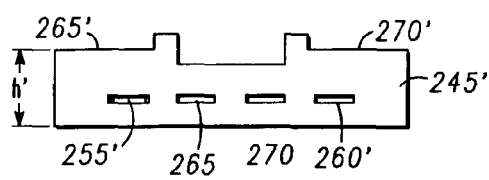
FIG. 11 is a schematic illustration of the connector shown with the wire harness shown in FIG. 6.
Figure 12:
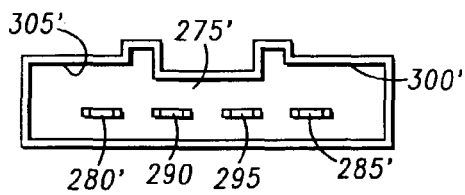
FIG. 12 is a schematic illustration of a cavity foe the connector shown in FIG. 9.

FIGS. 7 and 11 illustrate a portion of a wire harness segment 120' including connector 245'. FIG. 12 illustrates a cavity 255' for accepting the connector 245'. The wire harness segment 120' is sized for a second current capacity. In that regard, the power conductor 225' and the ground conductor 230' may have a thicker gage to account for the higher current carrying requirement at lower voltage. The corresponding power cavity 255' and ground cavity 260' are likewise enlarged to accept the thick gage conductors, and the power pin 280' and the ground pin 285' are also enlarged. In comparison to the connector 245 and cavity 255 pair illustrated in FIGS. 9 and 10, the shoulders 265' and 270' are sized differently to engage smaller recesses 300' and 305'.

Figure 8:
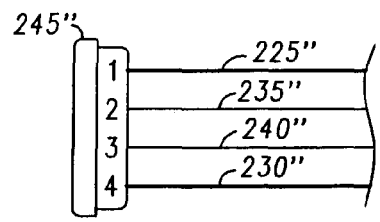
FIG. 8 is a schematic illustration of a portion of another wire harness of the communication and power distribution architecture shown in FIG. 1.
Figure 13:
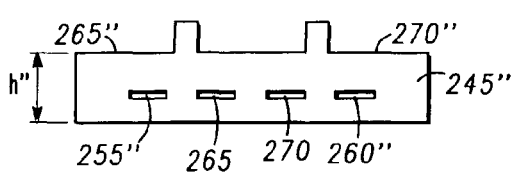
FIG. 13 is a schematic illustration of the connector shown with the wire harness shown in FIG. 6.
Figure 14:
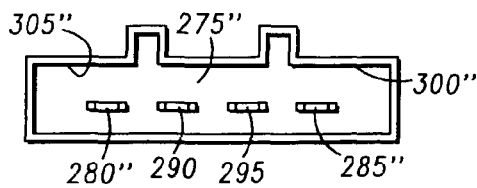
FIG. 14 is a schematic illustration of a cavity foe the connector shown in FIG. 9.

FIGS. 8 and 13 illustrate a portion of a wire harness segment 120" including connector 245". FIG. 14 illustrates a cavity 255" for accepting the connector 245". The wire harness segment 120" is sized for a second current capacity, for example 12 volts. In that regard, the power conductor 225" and the ground conductor 230" may be of thicker gage to account for the higher current carrying requirement at lower voltage. The corresponding power cavity 255" and ground cavity 260" are likewise enlarged to accept the thick gage conductors, and the power pin 280' and the ground pin 285' are also enlarged. In comparison to the connector 245 and cavity 255 pair illustrated in FIGS. 9 and 10, the shoulders 265" and 270" are again sized differently to engage smaller recesses 300" and 305'.

While it has been discussed to alter the sizes of the shoulders 265 and 270 and the corresponding recesses 300 and 305, one will appreciate that various other features of the connectors and the cavities may be altered to ensure that the proper size wire harness segments 120 is used for the current application.

Figure 15:
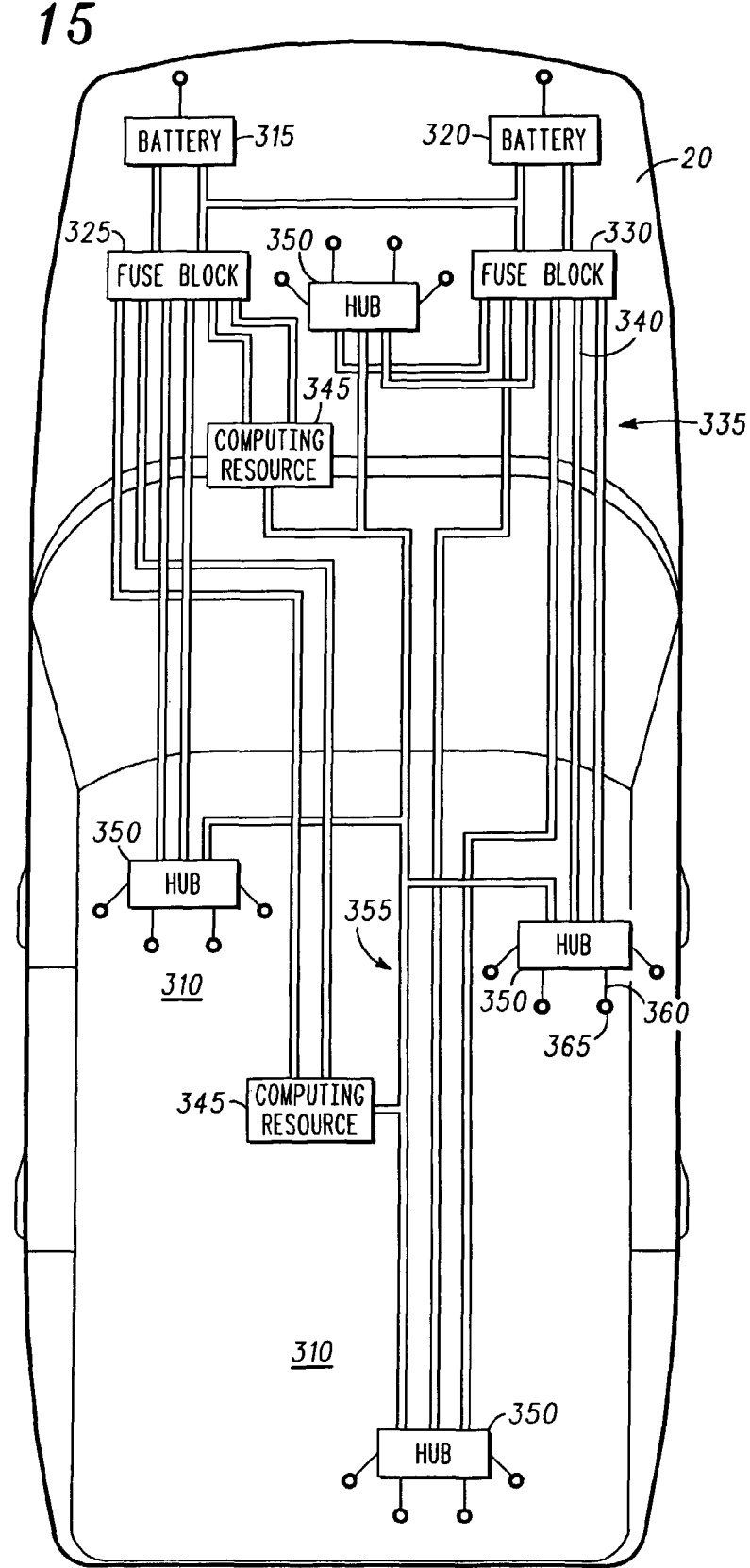
FIG. 15 is a schematic illustration of a communication and power distribution architecture integrated with a legacy power, ground and communication architecture.

Referring now to FIG. 15, a vehicle 20 includes a power, ground and communication architecture 310 having a traditional configuration. That is, a power source, batteries 315 and 320 feed power to fuse blocks 325 and 330, from which it is distributed via a network of conductors 335. The network 335 includes a plurality of conductors, one shown as conductor 340, for communicating power to the various power consuming devices within the vehicle, such as computing resources 345. A plurality of hubs 350, which may be configured similar to hubs 105, 110 and 115, are coupled to the network 335. A signaling network 355 couples the computing resources 345 and the hubs 350. The hubs 350 then couple power and signaling via standardized wire harness segments 360 to devices, one of which is shown as device 365. In this manner, the advantages of the hubs and standardized wire harness segments for distributing power and signaling to devices may be employed in a legacy power distribution architecture.

Figure 16:
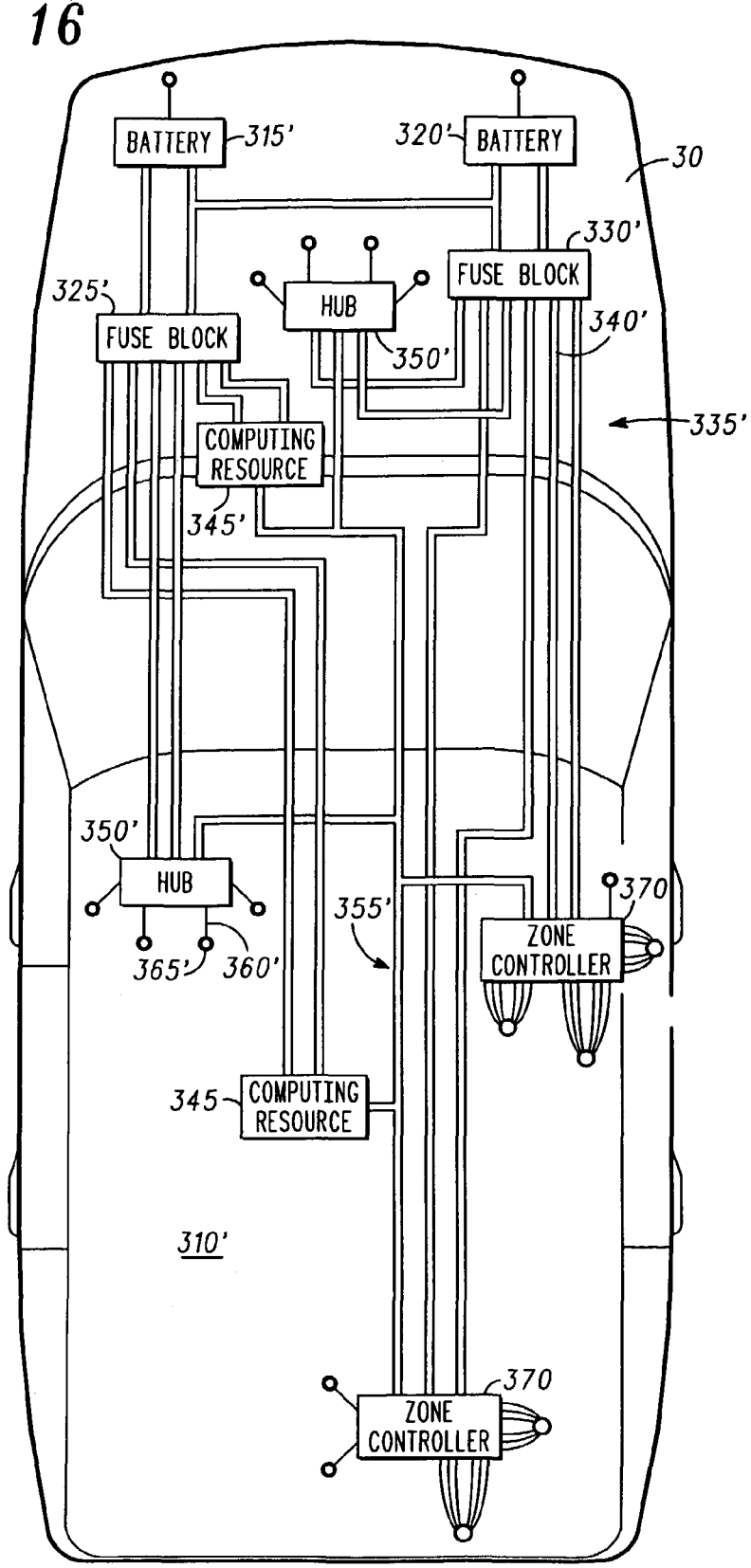
FIG. 16 is a schematic illustration of a communication and power distribution architecture integrated with a legacy power, ground and communication architecture incorporating zone controllers.

FIG. 16, illustrates a vehicle 30 that includes a power, ground and communication architecture 310' having a traditional configuration. That is, a power source, batteries 315' and 320' feed power to fuse blocks 325' and 330', from which it is distributed via a network of conductors 335'. The network 335' includes a plurality of conductors, one shown as conductor 340', for communicating power to the various power consuming devices within the vehicle, such as computing resources 345' and zone controllers 370. A plurality of hubs 350', which may be configured similar to hubs 105, 110 and 115, are coupled to the network 335'. A signaling network 355' couples the computing resources 345, the zone controllers 370 and the hubs 350'. The hubs 350' then couple power and signaling via standardized wire harness segments 360' to devices, one of which is shown as device 365'. In this manner, the advantages of the hubs and standardized wire harness segments for distributing power and signaling to devices may be employed in a legacy power distribution architecture.

Figure 17:
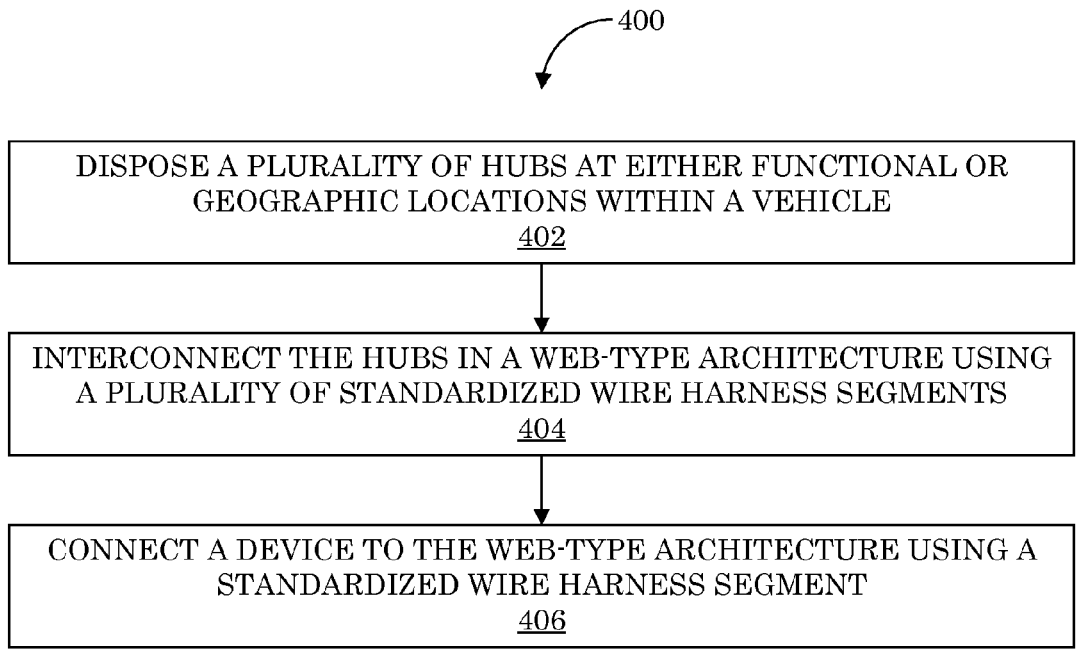
FIG. 17 is a flow chart illustrating a method of configuring a power, ground and communication architecture.

FIG. 17 illustrates a method 400 of configuring a power and communication architecture, such as the architecture 100, within a vehicle. A plurality of hubs is disposed at either functional or geographic locations within the vehicle, 402. Next, the hubs are interconnected in a web-type architecture using a plurality of standardized wire harness segments 404.

The standardized wire harness segments may be wire harness segments 120 and include a power conductor, a ground conductor and a signal conductor. A device is then connected to the web-type architecture using a standardized wire harness segment, 406.

Other modifications and alternative embodiments of the invention will be apparent to those skilled in the art in view of the foregoing description. This description is to be construed as illustrative only, and is for the purpose of teaching those skilled in the art the best mode of carrying out the invention. The details of the structure and method may be varied substantially without departing from the spirit of the invention, and the exclusive use of all modifications which come within the scope of the appended claims is reserved.

We claim:

1. A power and communication architecture for a vehicle comprising:
    a plurality of hubs disposed at various locations within the vehicle, each of the hubs having a power manager and a controller, each of the hubs having at least one port for coupling of the hub to another hub or to a device;
    a plurality of wire harness segments interconnecting the plurality of hubs, each of the wire harness segments having a power conductor, a ground conductor and at least one signal conductor, the power conductor, the ground conductor and the at least one signal conductor being secured at each end thereof to a connector, wherein the at least one port is sized to receive the connector;
    a first power source coupled to a hub of the plurality of hubs by a wire harness segment of the plurality of wire harness segments; and
    at least one of the plurality of wire harness segments is redundant,
    wherein each of the hubs of the plurality of hubs is joined by the plurality of wire harness segments in a web-type structure.

2. The power and communication architecture of claim 1, wherein the wire harness segments comprise standardized wire harness segments.

3. The power and communication architecture of claim 1, further comprising a second power source coupled to one of the hubs of the plurality of hubs, the second power source having a second voltage different than a first voltage of the first power source.

4. The power and communication architecture of claim 1, wherein the power manager is configured to manage a voltage input and a voltage output of the hub in a range of voltages from about 12 volts to about 42 volts.

5. The power and communication architecture of claim 1, wherein the power manager is configured to control current flow into the hub and from the hub.

6. The power and communication architecture of claim 1, wherein the power manager is operable to fault manage the hub.

7. The power and communication architecture of claim 1, wherein the power manager is operable to decouple the hub from the power and communication architecture upon detection of a power fault.

8. The power and communication architecture of claim 1, wherein the power manager is operable to decouple the hub from the power and communication architecture at the direction of the communication controller based on a message received from a central power management function.

9. The power and communication architecture of claim 1, wherein the power manager comprises a circuit.

10. The power and communication architecture of claim 1, wherein the power manager is placed within the connector of one of the wire harness segments.

11. The power and communication architecture of claim 1, wherein the power and communication architecture is coupled within a vehicle to a legacy architecture.

12. A method of configuring a power and communication architecture within a vehicle, the method comprising the steps of:
    disposing with the vehicle a plurality of hubs;
    interconnecting the plurality of hubs in a web-type architecture using a plurality of standardized wire harness segments, the standardized wire harness segments including a power conductor, a ground conductor and a signal conductor; and
    interconnecting at least one vehicle device to the web-type architecture using a standardized wire harness segment.

13. The method of claim 12, comprising the step of interconnecting a first power source to the web-type architecture using a standardized wire harness segment.

14. The method of claim 13, comprising the step of interconnecting a second power source, different from the first power source, to the web-type architecture using a standardized wire harness segment.

15. The method of claim 12, comprising providing a power manager in one of the hubs and the standardized wire harness segments.

16. The method of claim 12, comprising interconnecting the web-type architecture with a legacy architecture.

* * * * *